(12) United States Patent
Lee et al.

(10) Patent No.: US 11,658,501 B2
(45) Date of Patent: May 23, 2023

(54) SYSTEM AND METHOD FOR CONTROLLING LOW VOLTAGE DC CONVERTER FOR VEHICLE

(71) Applicants: Hyundai Motor Company, Seoul (KR); Kia Corporation, Seoul (KR)

(72) Inventors: Ho Joong Lee, Gyeonggi-do (KR); Dong Jun Shin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/473,313

(22) Filed: Sep. 13, 2021

(65) Prior Publication Data

US 2022/0320885 A1 Oct. 6, 2022

(30) Foreign Application Priority Data

Mar. 30, 2021 (KR) ........................ 10-2021-0041237

(51) Int. Cl.
*H02J 7/00* (2006.01)
*B60R 16/033* (2006.01)

(52) U.S. Cl.
CPC ........ *H02J 7/00712* (2020.01); *B60R 16/033* (2013.01); *H02J 7/00032* (2020.01); *H02J 7/0048* (2020.01)

(58) Field of Classification Search
CPC .. H02J 7/00712; H02J 7/00032; H02J 7/0048; B60R 16/033
See application file for complete search history.

(56) References Cited

U.S. PATENT DOCUMENTS

2019/0315192 A1* 10/2019 Smith ................ B60H 1/00885
2020/0062124 A1* 2/2020 Haputhanthri .......... H02J 7/045

FOREIGN PATENT DOCUMENTS

KR   2018-0133984 A   12/2018
KR   2020-0125879 A   11/2020

* cited by examiner

*Primary Examiner* — Carlos Amaya
(74) *Attorney, Agent, or Firm* — Fox Rothschild LLP

(57) ABSTRACT

A system for controlling a low voltage DC converter for a vehicle includes the low voltage DC converter configured to step down a voltage of a first battery and output an output voltage; a blower configured to operate using the output voltage of the low voltage DC converter as a power supply voltage; and a low voltage DC converter controller configured to receive information on whether the blower operates and an output setting of the blower, and control a magnitude of the output voltage of the low voltage DC converter, based on the received information on whether the blower operates and an output setting of the blower.

10 Claims, 2 Drawing Sheets

SYSTEM AND METHOD FOR CONTROLLING LOW VOLTAGE DC CONVERTER FOR VEHICLE

CROSS REFERENCE TO RELATED APPLICATION

The present application claims under 35 U.S.C. § 119(a) the benefit of Korean Patent Application No. 10-2021-0041237 filed on Mar. 30, 2021, the entire contents of which are incorporated by reference herein.

BACKGROUND

(a) Technical Field

The present disclosure relates to a system and method for controlling a low voltage DC converter for a vehicle, more particularly, to the system and method for controlling the low voltage DC converter configured to determine a scheme of controlling an output of the low voltage DC converter based on an operating state of a blower disposed in an air conditioning system of the vehicle.

(b) Description of the Related Art

An eco-friendly vehicle, such as an electric vehicle or a hybrid vehicle, which generates power by driving a motor using electric energy stored in an energy storage device, may include a main battery which is the energy storage device for storing motor driving power, an auxiliary battery which stores electric power of various loads in the vehicle, and a low voltage DC converter (LDC) which steps down a voltage of the main battery to provide charging power of the auxiliary battery or the electric power of the loads.

In general, when a load of the vehicle is not large, an output of the low voltage DC converter is properly and variably controlled depending on a state of a vehicle system to improve fuel economy, and when the load of the vehicle is large, the low voltage DC converter is controlled to output a fixed constant voltage so as to stably supply electric power to the load of the vehicle.

For example, when a blower of an air conditioning system operates, which corresponds to a high load level, in order to prevent a driver from recognizing an operation sound of a blower fan and maintain constant performance of the blower, a low voltage DC converter is controlled to maintain a constant output. That is, when the blower operates, the low voltage DC converter is controlled to output a constant voltage capable of supplying maximum power required by the blower. Further, a separate regulator is provided to properly step down a voltage provided from the low voltage DC converter, depending on an operating state of the blower, and provide the stepped-down voltage to the blower.

However, in the related art, since the low voltage DC converter is controlled to satisfy the required maximum power of the blower without considering power required in the blower in an operating state of the blower, a problem may be caused in that the low voltage DC converter outputs an unnecessarily high fixed voltage, and thus fuel economy is degraded.

In addition, since the output of the low voltage DC converter is always fixed while the blower operates, variable control depending on a state of the vehicle is not performed, and the fuel economy may be further degraded.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a system and method for controlling a low voltage DC converter for a vehicle, which may properly and variably control an output voltage of the low voltage DC converter providing a power supply voltage of a blower depending on an operating state of the blower when the blower operates, thereby improving fuel economy of the vehicle.

In an embodiment, a system for controlling a low voltage DC converter for a vehicle may include: the low voltage DC converter configured to step down a voltage of a first battery and output an output voltage; a blower configured to operate using the output voltage of the low voltage DC converter as a power supply voltage; and a low voltage DC converter controller configured to receive information on whether the blower operates and an output setting of the blower, and control a magnitude of the output voltage of the low voltage DC converter, based on the received information on whether the blower operates and an output setting of the blower.

When the blower is in an operating state and the output setting of the blower is greater than a preset threshold, the low voltage DC converter controller may control the low voltage DC converter such that the low voltage DC converter constantly outputs a preset output voltage value.

The preset output voltage value may correspond to a magnitude of a power supply voltage required for the blower at a maximum output of the blower.

When the blower is in an operating state and the output setting of the blower is less than or equal to the preset threshold, the low voltage DC converter controller may control the low voltage DC converter such that the low voltage DC converter outputs a voltage of a magnitude corresponding to the output setting of the blower.

When the blower is in an operating state and the output setting of the blower is less than or equal to the preset threshold, the low voltage DC converter controller may check a state of charge of a second battery which is charged by the output voltage of the low voltage DC converter. When the state of charge of the second battery is greater than a preset threshold, the low voltage DC converter controller may control the low voltage DC converter such that the low voltage DC converter outputs the voltage of the magnitude corresponding to the output setting of the blower.

When the blower is in an operating state and the output setting of the blower is less than or equal to the preset threshold, the low voltage DC converter controller may check a state of charge of a second battery which is charged by the output voltage of the low voltage DC converter. When the state of charge of the second battery is less than or equal to a preset threshold, the low voltage DC converter controller may control the low voltage DC converter such that the low voltage DC converter outputs a voltage of a magnitude capable of charging the second battery.

The system may further include a step-down regulator configured to step down the output voltage of the low voltage DC converter to convert the output voltage of the low voltage DC converter into the power supply voltage of the blower.

In another embodiment, a method for controlling a low voltage DC converter for a vehicle, including the low voltage DC converter which steps down a voltage of a first battery and outputs an output voltage and a blower which operates using the output voltage of the low voltage DC converter as a power supply voltage, may include: a step of receiving, by a low voltage DC converter controller, information on whether the blower operates and an output setting of the blower; a first control step of controlling, by the low voltage DC converter controller, the low voltage DC converter such that the low voltage DC converter constantly outputs a preset output voltage value, when the blower is in an operating state and the output setting of the blower is greater than a preset threshold; and a second control step of controlling, by the low voltage DC converter controller, the low voltage DC converter such that the low voltage DC converter outputs a voltage of a magnitude corresponding to the output setting of the blower, when the blower is in an operating state and the output setting of the blower is less than or equal to the preset threshold.

The preset output voltage value may correspond to a magnitude of a power supply voltage required for the blower at a maximum output of the blower.

The second control step may include: checking a state of charge of a second battery which is charged by the output voltage of the low voltage DC converter; and controlling, when the state of charge of the second battery is greater than a preset threshold, the low voltage DC converter such that the low voltage DC converter outputs the voltage of the magnitude corresponding to the output setting of the blower.

the second control step may include: checking a state of charge of a second battery which is charged by the output voltage of the low voltage DC converter; and controlling, when the state of charge of the second battery is less than or equal to a preset threshold, the low voltage DC converter such that the low voltage DC converter outputs a voltage of a magnitude capable of charging the second battery.

The controlling of the low voltage DC converter such that the low voltage DC converter outputs a voltage of a magnitude capable of charging the second battery may step down the output voltage of the low voltage DC converter to provide the power supply voltage of the blower.

According to the system and method for controlling a low voltage DC converter for a vehicle, by properly controlling a scheme of providing a power supply voltage to a blower, depending on an output of the blower of an air conditioning system, it is possible to significantly improve the fuel economy of the vehicle.

In particular, according to the system and method for controlling a low voltage DC converter for a vehicle, when the blower operates at a low output, instead of a scheme of controlling in advance a low voltage DC converter to constantly output a voltage corresponding to a maximum output of the blower, the low voltage DC converter may be controlled to output, directly to the blower, a power supply voltage corresponding to a low output of the blower, thereby preventing the fuel economy from being degraded due to unnecessary power consumption.

The effects obtainable in the present disclosure are not limited to the aforementioned effects, and other effects not mentioned may be clearly understood by those skilled in the art to which the present disclosure pertains from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system and method for controlling a low voltage DC converter for a vehicle according to a variety of exemplary embodiments of the present disclosure will be described in detail with reference to the accompanying drawings.

Figure 1:
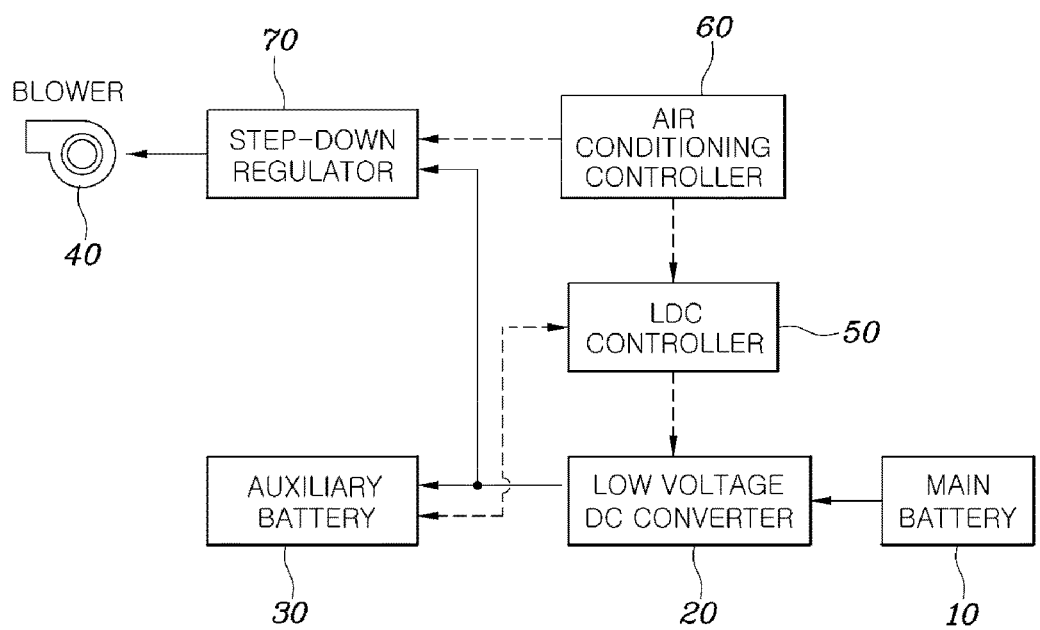
FIG. 1 is a block diagram illustrating the configuration of a system for controlling a low voltage DC converter for a vehicle according to an embodiment of the present disclosure.

FIG. 1 is a block diagram illustrating the configuration of a system for controlling a low voltage DC converter for a vehicle according to an embodiment of the present disclosure.

Referring to FIG. 1, a system for controlling a low voltage DC converter for a vehicle according to an embodiment of the present disclosure may include a main battery 10; a low voltage DC converter 20 configured to step down a voltage of the main battery 10 and output an output voltage; an auxiliary battery 30 configured to be charged by receiving the output voltage of the low voltage DC converter 20; a blower 40 configured to operate using the output voltage of the low voltage DC converter 20 as a power supply voltage; and an LDC controller 50 configured to receive information on whether the blower 40 operates and an output setting of the blower 40, and control a magnitude of the output voltage of the low voltage DC converter 20 based thereon.

The main battery 10, as an energy storage device which supplies electric power to a driving motor (not illustrated) which generates vehicle power by being disposed in an electric vehicle or a plug-in hybrid vehicle, may be charged by using the electric power provided from the outside.

The low voltage DC converter 20 is a component which converts a high voltage of the main battery 10 into a low voltage applicable to the auxiliary battery 30 or the blower 40 being an electric load. Although not illustrated, the low voltage DC converter 20 may be a circuit which is implemented by applying various DC converter topologies known in the art.

An output of the low voltage DC converter 20 may be controlled by the LDC controller 50.

For example, the LDC controller 50 may be generally configured by a processor and a memory, and may be implemented in a form in which a control algorithm stored in advance in the memory is executed by a calculation operation of the processor.

In an exemplary embodiment of the present disclosure, the LDC controller 50, as a controller for controlling the low voltage DC converter 20, may generate a command for an output voltage of the low voltage DC converter 20 based on various inputs provided from the outside, and may control a switching element in a circuit part configuring the low voltage DC converter 20 by pulse width modulation or frequency modulation using a preset control algorithm depending on a result of comparing a value obtained by detecting the output voltage of the low voltage DC converter 20 with the output voltage command so as to output the generated output voltage command, thereby controlling the low voltage DC converter 20 so that the low voltage DC converter 20 may output a voltage of a desired magnitude.

Various topologies for implementing the circuit part of the low voltage DC converter 20 and corresponding output voltage/current control techniques are already disclosed in the art, and thus, further detailed description will be omitted herein.

The auxiliary battery 30 is configured to provide the electric power of a power supply to various electric loads applied to the vehicle, and may be connected to the output terminal of the low voltage DC converter 20 together with the electric loads (for example, the blower 40). The auxiliary battery 30 may be charged by the current outputted from the low voltage DC converter 20, and may be discharged by providing load power using in the electric loads.

The blower 40, as a component included in the air conditioning system of the vehicle, may operate by using the output voltage of the low voltage DC converter 20 as a power supply voltage.

In a conventional air conditioning system of a vehicle, the blower 40, as a device for supplying air to the interior of the vehicle, may be configured by a fan and a motor (not illustrated). The motor of the blower 40 may generate a rotational force by using a power supply voltage provided from the low voltage DC converter 20, and may rotate the fan with the rotational force, thereby allowing air to flow into the vehicle.

The air conditioning system of the vehicle may include an air conditioning controller 60 for controlling the air conditioning system, and the air conditioning controller 60 may set whether to operate the blower 40 and an output of the blower 40 in consideration of various factors.

For example, when an air conditioning mode is set to an auto mode by a driver, the air conditioning controller 60 may calculate a difference between an indoor temperature set by the driver and an indoor temperature measured through a temperature sensor or the like, and may operate the blower 40 by setting an operation output of the blower 40 to be higher as the corresponding difference is larger.

An exemplary embodiment of the present disclosure may include a step-down regulator 70 which steps down an output voltage of the low voltage DC converter 20 and provides the stepped-down output voltage as a power supply voltage of the blower 40. The step-down regulator 70 may operate when it needs to step down a magnitude of a power supply voltage provided to the blower 40 in a state which an output voltage of the low voltage DC converter 20 cannot be varied.

The step-down regulator 70 is also a common electric and electronic part known in the art. Even though additional description for a detailed circuit configuration or control method of the step-down regulator 70 is omitted, a person skilled in the art will have no difficulties in configuring and operating the step-down regulator 70.

Figure 2:
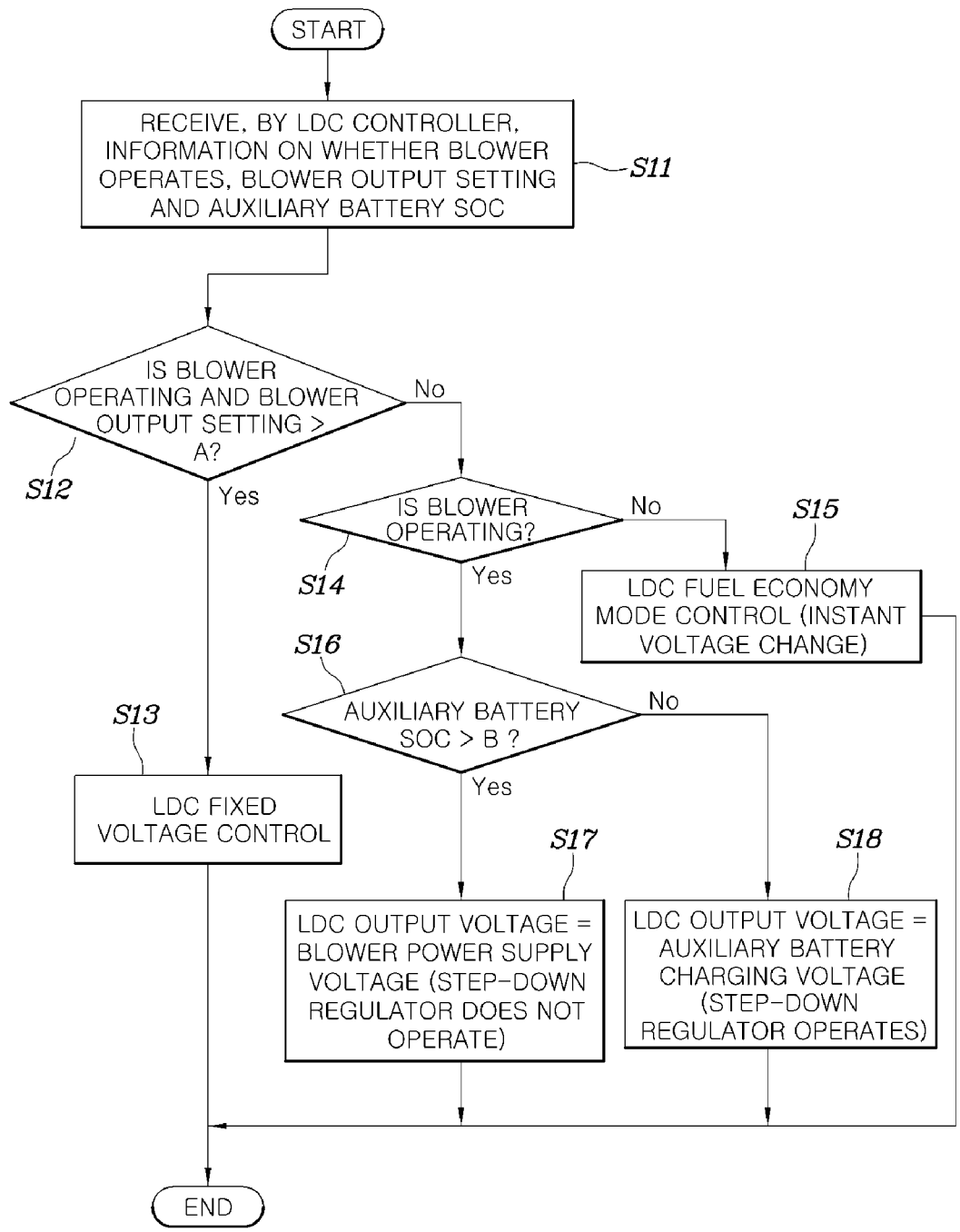
FIG. 2 is a flow chart illustrating a method for controlling a low voltage DC converter for a vehicle according to an embodiment of the present disclosure.

FIG. 2 is a flow chart illustrating a method for controlling a low voltage DC converter for a vehicle according to an embodiment of the present disclosure. The control method illustrated in FIG. 2 may be implemented by the system for controlling a low voltage DC converter for a vehicle illustrated in FIG. 1. The operation and working effects of the system for controlling a low voltage DC converter a vehicle illustrated in FIG. 1 may be clearly understood through the description for the method for controlling a low voltage DC converter for a vehicle according to an exemplary embodiment of the present disclosure made with reference to FIGS. 1 and 2.

The method for controlling a low voltage DC converter for a vehicle according to the embodiment of the present disclosure may be started from step S11 in which the LDC controller 50 receives status information on the blower 40 from the air conditioning controller 60.

When information related with the operation of the blower 40 is changed, the LDC controller 50 may receive status information on the blower from the air conditioning controller 60 in the air conditioning system. The information on the blower 40 received by the LDC controller 50 may include information on whether the blower 40 operates and an output setting of the blower 40. When the blower 40 starts to operate, the air conditioning controller 60 may provide information that the blower 40 is operating, to the LDC controller 50. In addition, the air conditioning controller 60 may set an output of the blower 40 according to a setting of the driver, and may also provide the set output of the blower 40 to the LDC controller 50. Here, the output of the blower 40 may be understood as the output of the motor in the blower 40.

Subsequently, the LDC controller 50 may properly perform the control of the low voltage DC converter 20 by using the received information.

When the blower 40 is in an operating state and the output setting of the blower 40 is greater than a preset threshold A (S12), the LDC controller 50 may control the low voltage DC converter 20 so that the low voltage DC converter 20 constantly outputs a preset output voltage value. The fixed output voltage value may correspond to a power supply voltage value required when the blower 40 operates at a maximum output (S13).

When an output of the blower 40 requires a high output exceeding the preset threshold A, it is more advantageous for a stable operation of the air conditioning system to cause the blower 40 to operate at a high output rather than to improve fuel economy by variably controlling the output voltage of the low voltage DC converter 20.

When the blower 40 is in an operating state and the output setting of the blower 40 is less than or equal to the preset threshold A (S12 and S14), the LDC controller 50 may control the low voltage DC converter 20 so that the low voltage DC converter 20 outputs a power supply voltage of a magnitude corresponding to the output setting of the blower 40 (S17). That is, when the output setting of the blower 40 is less than or equal to the threshold A, the LDC controller 50 may control the low voltage DC converter 20 so that an output voltage of the low voltage DC converter 20 may be directly provided as a power supply voltage of the blower 40.

When an output of the blower 40 requires a low output less than or equal to the preset threshold A, the low voltage DC converter 20 may be controlled so that an output voltage the low voltage DC converter 20 may be directly provided as a power supply voltage of the blower 40, whereby it is possible to prevent unnecessary waste of energy by outputting a fixed high voltage.

On the other hand, when the blower 40 is in an operating state and the output setting of the blower 40 is less than or equal to the preset threshold A (S12 and S14), a technique of controlling an output of the low voltage DC converter 20 in consideration of a state of charge (SOC) of the auxiliary battery 30 may be applied.

In other words, when the blower 40 is in an operating state and the output setting of the blower 40 is less than or equal to the preset threshold A (S12 and S14), the LDC controller 50 may check the state of charge of the auxiliary battery 30. When the state of charge of the auxiliary battery 30 is greater than a preset threshold B (S16), as described above, the LDC controller 50 may control the low voltage DC converter 20 so that the low voltage DC converter 20 outputs a power supply voltage of a magnitude corresponding to the output setting of the blower 40 (S17).

On the other hand, when the state of charge of the auxiliary battery 30 is less than or equal to the preset threshold B (S16), the LDC controller 50 may control the low voltage DC converter 20 so that the low voltage DC converter 20 outputs a voltage capable of charging the auxiliary battery 30 (S18).

The auxiliary battery 30 is an energy storage device which supplies power of an important electric load such as ignition on of a vehicle, and thus, the state of charge thereof always needs to be higher than a predetermined level. Accordingly, when the output setting of the blower 40 is at a low output setting state, the LDC controller 50 may first check the state of charge of the auxiliary battery 30.

When the state of charge of the auxiliary battery 30 is greater than the threshold B, since the charging of the auxiliary battery 30 is not required, the LDC controller 50 may control the low voltage DC converter 20 so that the low voltage DC converter 20 outputs a power voltage of the blower 40 having a low voltage value. In this case, since an output voltage of the low voltage DC converter 20 is substantially the same as a power supply voltage corresponding to the output setting of the blower 40, the step-down regulator 70 provided at the front end of the blower 40 does not operate, and the output of the low voltage DC converter 20 may be provided to the blower 40 by being bypassed.

When the state of charge of the auxiliary battery 30 is less than or equal to the threshold B, since the auxiliary battery 30 needs to be charged, the LDC controller 50 may control the low voltage DC converter 20 so that the low voltage DC converter 20 outputs a voltage value capable of charging the auxiliary battery 30. In this case, since an output voltage of the low voltage DC converter 20 may be higher than a power supply voltage corresponding to the output setting of the blower 40, the step-down regulator 70 provided at the front end of the blower 40 may step down the output voltage of the low voltage DC converter 20 to a power supply voltage corresponding to an output setting of the blower 40 through a step-down operation, so that the stepped-down voltage may be provided to the blower 40.

On the other hand, when the blower 12 is not in an operating state (S12 and S14), the LDC controller 50 may variably control an output voltage of the low voltage DC converter 20 in consideration of various factors related with the driving of a vehicle so that optimal fuel economy may be realized. The variable control of the output voltage of the low voltage DC converter 20 for optimum fuel economy may be variously carried out by applying a unique algorithm preset for each vehicle manufacturer.

As is apparent from the above description, according to the system and method for controlling a low voltage DC converter for a vehicle in accordance with the embodiments of the disclosure, by properly controlling a scheme of providing a power supply voltage to a blower, depending on an output of the blower of an air conditioning system, it is possible to significantly improve the fuel economy of the vehicle.

In particular, when the blower operates at a low output, instead of a scheme of controlling in advance a low voltage DC converter to constantly output a voltage corresponding to a maximum output of the blower, the low voltage DC converter may be controlled to output, directly to the blower, a power supply voltage corresponding to a low output of the blower, thereby preventing the fuel economy from being degraded due to unnecessary power consumption.

While the specific exemplary embodiments of the present disclosure have been illustrated and described, it will be apparent to those skilled in the art that various improvements and changes of the present disclosure are possible without departing from the technical spirit of the present disclosure provided by the appended claims.

What is claimed is:

1. A system for controlling a low voltage DC converter of a vehicle, the system comprising:
   the low voltage DC converter configured to step down a voltage of a first battery and output an output voltage;
   a blower configured to operate using the output voltage of the low voltage DC converter as a power supply voltage; and
   a low voltage DC converter controller configured to receive information on whether the blower operates and an output setting of the blower, and control a magnitude of the output voltage of the low voltage DC converter, based on the received information on whether the blower operates and an output setting of the blower;

wherein when the blower is in an operating state and the output setting of the blower is greater than a preset threshold, the low voltage DC converter controller controls the low voltage DC converter such that the low voltage DC converter constantly outputs a preset output voltage value.

2. The system according to claim 1, wherein the preset output voltage value corresponds to a magnitude of a power supply voltage required for the blower at a maximum output of the blower.

3. The system according to claim 1, wherein when the blower is in an operating state and the output setting of the blower is less than or equal to the preset threshold, the low voltage DC converter controller controls the low voltage DC converter such that the low voltage DC converter outputs a voltage of a magnitude corresponding to the output setting of the blower.

4. The system according to claim 1, wherein:
when the blower is in an operating state and the output setting of the blower is less than or equal to the preset threshold, the low voltage DC converter controller checks a state of charge of a second battery which is charged by the output voltage of the low voltage DC converter, and
when the state of charge of the second battery is greater than a preset threshold, the low voltage DC converter controller controls the low voltage DC converter such that the low voltage DC converter outputs the voltage of the magnitude corresponding to the output setting of the blower.

5. The system according to claim 1, wherein:
when the blower is in an operating state and the output setting of the blower is less than or equal to the preset threshold, the low voltage DC converter controller checks a state of charge of a second battery which is charged by the output voltage of the low voltage DC converter, and
when the state of charge of the second battery is less than or equal to a preset threshold, the low voltage DC converter controller controls the low voltage DC converter such that the low voltage DC converter outputs a voltage of a magnitude capable of charging the second battery.

6. The system according to claim 5, further comprising:
a step-down regulator configured to step down the output voltage of the low voltage DC converter to convert the output voltage of the low voltage DC converter into the power supply voltage of the blower.

7. A method for controlling a low voltage DC converter for a vehicle including the low voltage DC converter which steps down a voltage of a first battery and outputs an output voltage and a blower which operates using the output voltage of the low voltage DC converter as a power supply voltage, the method comprising:
a step of receiving, by a low voltage DC converter controller, information on whether the blower operates and an output setting of the blower;
a first control step of controlling, by the low voltage DC converter controller, the low voltage DC converter such that the low voltage DC converter constantly outputs a preset output voltage value, when the blower is in an operating state and the output setting of the blower is greater than a preset threshold; and
a second control step of controlling, by the low voltage DC converter controller, the low voltage DC converter such that the low voltage DC converter outputs a voltage of a magnitude corresponding to the output setting of the blower, when the blower is in an operating state and the output setting of the blower is less than or equal to the preset threshold.

8. The method according to claim 7, wherein the preset output voltage value corresponds to a magnitude of a power supply voltage required for the blower at a maximum output of the blower.

9. The method according to claim 8, wherein the second control step comprises:
checking a state of charge of a second battery which is charged by the output voltage of the low voltage DC converter; and
controlling, when the state of charge of the second battery is greater than a preset threshold, the low voltage DC converter such that the low voltage DC converter outputs the voltage of the magnitude corresponding to the output setting of the blower.

10. The method according to claim 8, wherein the second control step comprises:
checking a state of charge of a second battery which is charged by the output voltage of the low voltage DC converter; and
controlling, when the state of charge of the second battery is less than or equal to a preset threshold, the low voltage DC converter such that the low voltage DC converter outputs a voltage of a magnitude capable of charging the second battery.

* * * * *